B. C. BALL & L. E. YOUNIE.
DEMOUNTABLE TIRE RIM.
APPLICATION FILED SEPT. 28, 1910.

1,109,816.

Patented Sept. 8, 1914.

2 SHEETS—SHEET 1.

Witnesses
M. L. Dodge
Blanche Hartman

Inventor
Bert C. Ball
and
Lewis E. Younie
by H. L. Lind
Attorney

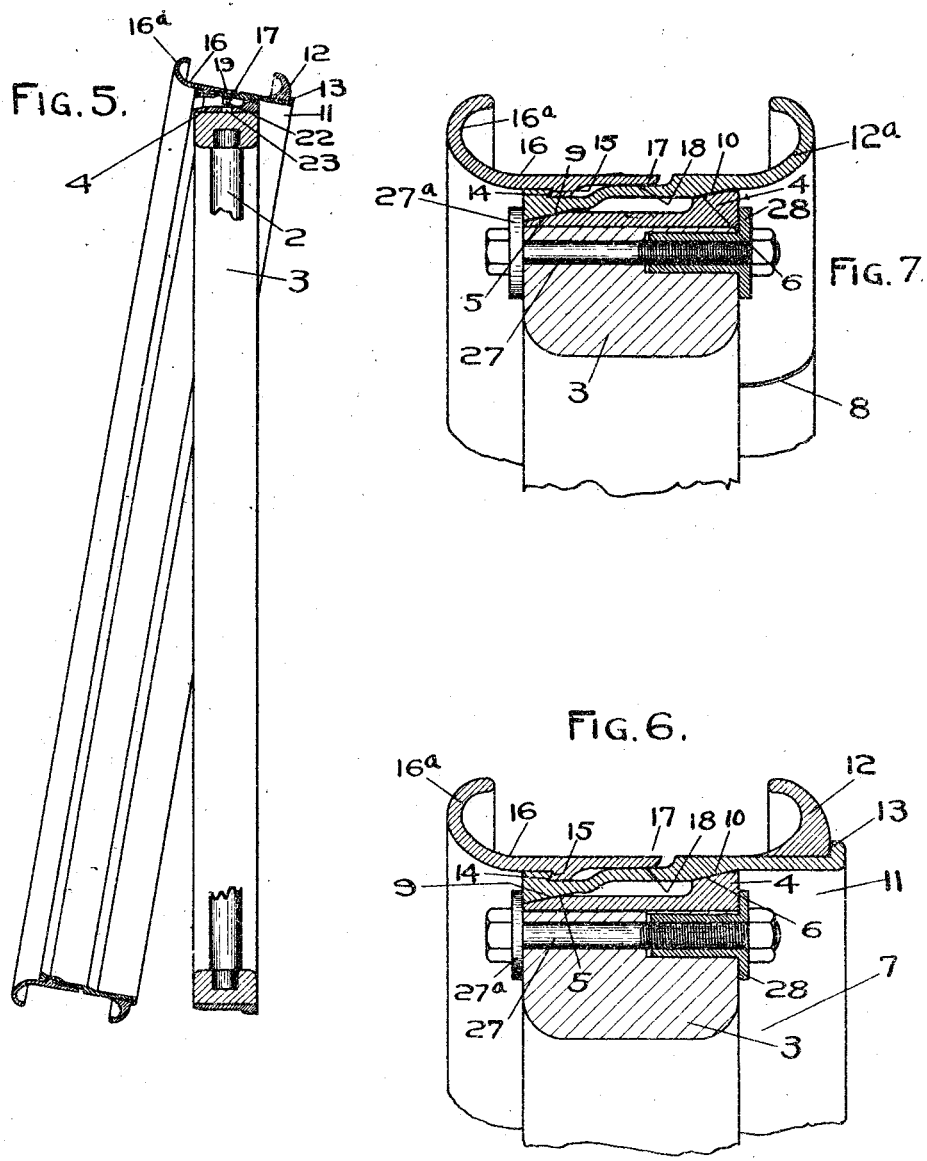

UNITED STATES PATENT OFFICE.

BERT C. BALL AND LEWIS E. YOUNIE, OF PORTLAND, OREGON.

DEMOUNTABLE TIRE-RIM.

1,109,816.   Specification of Letters Patent.   Patented Sept. 8, 1914.

Application filed September 28, 1910. Serial No. 584,161.

*To all whom it may concern:*

Be it known that we, BERT C. BALL and LEWIS E. YOUNIE, citizens of the United States, residing at Portland, in the county of Multnomah and State of Oregon, have invented new and useful Improvements in Demountable Tire-Rims, of which the following is a specification.

This invention relates to demountable tire rims, and consists in certain improvements in the construction thereof as will be hereinafter fully described and pointed out in the claims.

This invention is particularly advantageous where it is desirable to carry a tire on the rim in an inflated condition. In addition to this, the present construction is such that a tire itself may be quickly and readily detached from the rim, so that in this sense, the invention relates to a separable rim.

Figure 1:
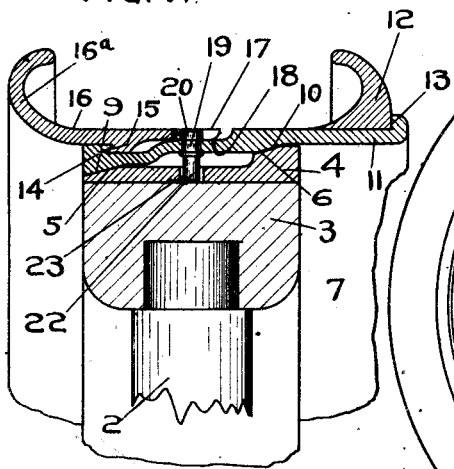
Figure 2:
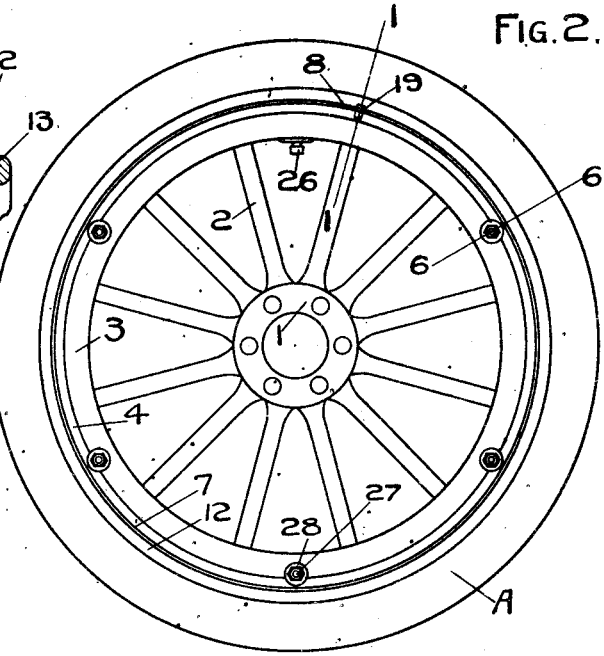
Figure 3:
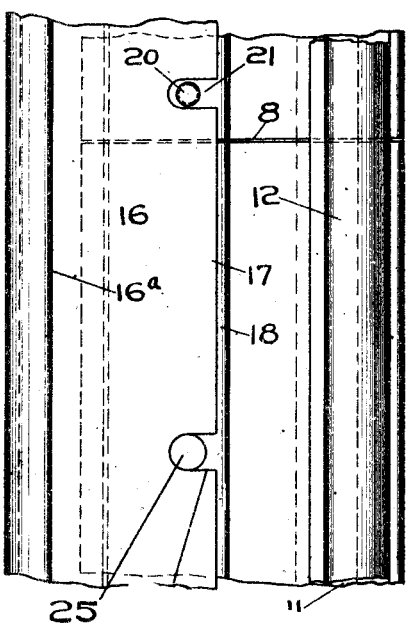
Figure 4:
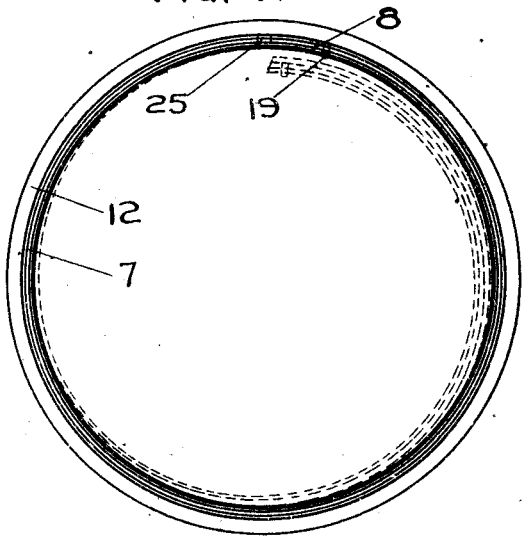

The invention is illustrated in the accompanying drawings as follows:

Figure 1 shows a section on the line 1—1 in Fig. 2. Fig. 2 is a side elevation of a wheel with a tire and rim in place thereon. Fig. 3 a plan view of a fragment of the rim. Fig. 4 a side elevation of the rim, showing the method of unlocking the rim parts. Fig. 5 a central section showing the method of placing the demountable rim on the fixed rim. Fig. 6 a section on the line 6—6 in Fig. 2. Fig. 7 a transverse section of an alternative construction.

1 marks the wheel hub, 2 the spokes, and 3 the felly. These may be of any ordinary construction. The fixed rim 4 is arranged on the felly. It has the tapered surfaces 5 and 6. A locking ring 7 is arranged on the fixed rim. It is separated transversely at 8. The locking ring has the tapered surfaces 9 and 10 on its interior which conform to the tapered surfaces 5 and 6 respectively. It has the lateral extension 11 forming a supporting surface for the tire flange 12, the ring itself forming a tire supporting surface for the tire. The tire flange 12 is in the form of a ring, and when in place prevents the separation or expansion of the locking ring. The locking ring has the rib 13 at its outer edge which locks the tire retaining shoulder against lateral displacement.

The locking ring has a shoulder 14 on its outer periphery which engages a shoulder 15 on the inner periphery of the rim part 16. These shoulders are preferably undercut as shown. The rim part 16 has a tire retaining flange 16ª bent up from the rim part itself.

The rim part 16 has a lip 17 which extends inwardly beyond the shoulder 15, and telescopically engages the surface 18 on the locking ring 7. A pin 19 is fixed in the locking ring 7. Its outer extension 20 projects into the slot 21 in the rim part 16. The inner extension 22 of this pin projects into the perforation 23 in the fixed rim 4, thus locking all the parts against creeping. The rim part 16 has the slot 24, and the locking ring the perforation 25 through which the valve stem 26 projects. The felly bolts 27 extend through the felly, the head 27ª engaging the thicker edge of the locking ring 7. A flange nut 28 at the opposite end of the bolt engages the thicker edge of the fixed rim.

In the alternative construction shown in Fig. 7, instead of the supporting surface 11 and a separate tire retaining flange, the tire flange 12ª is bent up on the locking ring itself.

In demounting the rim, the bolts 27 are removed, and the side of the rim opposite the pin 19 is swung off the fixed rim shown in Fig. 5. The locking ring can then be sprung inwardly as shown in Fig. 4, the transverse parting of the rim being slightly on the slant relatively to the radial line, so as to readily permit an end of the locking ring to spring inwardly. This relieves both the tire retaining flanges 12 and 16ª so that these parts may be readily detached from the tire.

In the alternative construction, a similar operation is used to detach the tire, except that the springing in of the locking ring also carries with it the tire retaining flange 12ª.

What we claim as new is:

1. In a demountable tire rim, the combination of three rim parts, the first part separated transversely and having an exterior locking shoulder thereon, a tire supporting surface and a rib at its edge; a second part forming a complete ring and having an interior locking shoulder engaging the shoulder on the first part, and a tire retaining flange integral with said second part; and a third part in the form of a ring forming a tire retaining flange arranged on the first part and against said rib.

2. In a demountable tire rim, the combination of three rim parts, the first part separated transversely and having an exterior locking shoulder thereon, a tire supporting surface, and a rib at its edge, the locking shoulder being at the opposite side of the assembled rim from the rib; a second part forming a complete ring and having an interior locking shoulder engaging the shoulder on the first part, and a tire retaining flange integral with said second part; and a third part in the form of a ring forming a tire retaining flange arranged on the first part and against said rib.

3. In a demountable tire rim, the combination of three rim parts, the first part separated transversely and having an exterior locking shoulder thereon, a tire supporting surface, and a rib at its edge, the locking shoulder being at the opposite side of the assembled rim from the rib; a second part forming a complete ring and having an interior locking shoulder engaging the shoulder on the first part, a tire retaining flange integral with said second part, and a lip extending laterally from the shouldered portion of the part and toward the lateral center of the assembled rim; and a third part in the form of a ring forming a tire retaining flange arranged on the first part and against said rib.

4. In a demountable tire rim, the combination of two rim parts, the first part separated transversely, and having an exterior shoulder thereon, and having a tire supporting surface on its outer surface, and the second part forming a complete ring and having an interior shoulder engaging the shoulder on the first part, and provided with an opening at its edge, and a pin secured to the first of said parts and extending outwardly into said opening.

In testimony whereof we have hereunto set our hands in the presence of two subscribing witnesses.

BERT C. BALL.
LEWIS E. YOUNIE.

Witnesses:
G. W. STAPLETON,
E. F. SHUMAKER.